United States Patent

[11] 3,554,379

| [72] | Inventor | Donald George Pye<br>Wilmington, Del. |
| --- | --- | --- |
| [21] | Appl. No. | 831,969 |
| [22] | Filed | June 10, 1969 |
| [45] | Patented | Jan. 12, 1971 |
| [73] | Assignee | E. I. du Pont de Nemours and Company<br>Wilmington, Del.<br>a corporation of Delaware |

[54] DESALINATION APPARATUS AND PROCESS OF MANUFACTURE USING IMPROVED, ACID GRAFTED NITROGENOUS MEMBRANES
23 Claims, 2 Drawing Figs.

[52] U.S. Cl. .................................................. 210/321,
210/500, 264/258, 264/277
[51] Int. Cl. .................................................. B01d 13/00
[50] Field of Search .......................................... 210/22, 23,
32, 500, 490, 491; 264/48, 177, 209, 277, 258, 279

[56] References Cited
UNITED STATES PATENTS

| 3,140,256 | 7/1964 | Martin et al. ................. | 210/23 |
| 3,423,491 | 1/1969 | McLain et al. ................ | 210/321X |

*Primary Examiner*—Frank A. Spear, Jr.
*Attorney*—Louis H. Rombach

ABSTRACT: Selectively permeable membranes comprising substantially linear nitrogenous polymers grafted with polymerizable unsaturated organic acids are chemically treated to convert free acid groups present into forms exhibiting a lesser degree of hydrophilicity, such as polyvalent metal salt forms or nonacidic derivative forms. The inventive treatment reduces the tendency of such membranes for swelling or dimensional change in water and thereby makes practical the assembly and operation of permeation separation apparatus in which they are incorporated either in the form of a flat film or in the form of a hollow fiber or capillary.

INVENTOR
DONALD G. PYE

BY  *Morris Wiseman*
ATTORNEY 3,554,379

DESALINATION APPARATUS AND PROCESS OF MANUFACTURE USING IMPROVED, ACID GRAFTED NITROGENOUS MEMBRANES

BACKGROUND OF THE INVENTION

1. Field of the Invention

This invention relates to the improvement of acid grafted, substantially linear nitrogenous polymeric membranes for use in the reverse osmosis separation of components of aqueous solutions and mixtures and particularly to the treatment of such membranes to reduce their tendency to swell in water. More particularly, the invention concerns the process of treating said membranes to convert acid groups present in the membrane polymer into less hydrophilic groups thereby reducing the membrane potential for dimensional change in water. The invention also relates to the reverse osmosis membranes resulting from such treatment and to the permeation separation apparatus improved by the incorporation of the treated membranes.

2. Description of the Prior Art

Selectively permeable or semipermeable membranes are well known in the prior art and comprise structures which permit passage of certain molecules at preferential rates. Where such a membrane provides a barrier between an aqueous solution on one side and water alone on the other side and preferential passage of water molecules occurs from the latter side to the solution side, the phenomenon is known as osmosis and the membrane involved is commonly termed an osmotic membrane. The pressure causing the passage or permeation of water molecules through the osmotic membrane into the aqueous solution is a measurable value varying with the character and concentration of the solution, and the value that just prevents further passage is called the osmotic pressure of the solution. Application to the solution of a pressure in excess of its osmotic pressure results in the process of reverse osmosis, wherein water molecules from the solution are forced through the membrane at a rate higher than that of other molecules or components of the solution, the direction of passage of the water molecules through the membrane being opposite that in the case of osmosis, i.e., passage occurs from the solution side rather than to the solution side.

In view of the low energy requirements inherent in the process of reverse osmosis, such process is generally recognized as representing an attractive and promising application in the field of permeability separation, particularly in the separation of the components of aqueous solutions such as saline and brackish waters. As the controlling factor in effecting such a separation is the permeation membrane itself, selectively permeable membranes suitable for use in the reverse osmosis process, i.e., reverse osmosis membranes, have for many years been the subject of considerable investigation and study in efforts to improve their operational characteristics and to develop their use in permeation separation devices.

Particularly desirable reverse osmosis membranes exhibiting significantly improved characteristics of water permeability and resulting from the aforementioned prior art efforts are described in U.S. Pat. application Ser. No. 678,148, filed Oct. 11, 1967, by Hoehn et al. The latter teach that the acid grafted nitrogenous polymers described by Tanner in U.S. Pat. No. 3,099,631 are effective membranes for the separation of potable water from saline and brackish waters by the process of reverse osmosis. Tanner, infra, discloses the grafting of fabrics of nylon, i.e., synthetic substantially linear nitrogenous condensation polymers, with polymerizable organic acids, such as acrylic acid, by radiation or catalytic means to provide improved properties desirable in the textile and wearing apparel trade, e.g., wet crease recovery, postformability, hole melting resistance, wickability and the like, but unrelated to the field of reverse osmosis membranes.

The modified nitrogenous polymeric membranes of Hoehn et al., infra, are particularly attractive since they may be readily prepared by grafting polymerizable organic acids to thin walled hollow filaments or capillaries made of nylon polymers by melt spinning in accordance with prior art techniques, e.g., as disclosed in French Patent 990,726; British Patents 843,179 and 859,814 and by Breen et al. in U.S. Pat. No. 2,999,296. These membrane configurations are conveniently incorporated in permeation separation apparatus of a type generally employed in reverse osmosis processes and described by Mahon in U.S. Pat. Nos. 3,228,876 and 3,228,877 and by Maxwell et al. in U.S. Pat. No. 3,339,341. In this type of apparatus, hollow filaments of a membrane material are mounted within a suitable shell by encapsulating them near their ends with a potting compound, such as an epoxy resin cement, in an initially fluid state which is thereafter permitted or caused to harden into a wall member or capillary sheet which provides a fluid seal separating the region communicating with the outer areas of the capillaries, i.e., shell side, from the region communicating with the hollow interiors of said capillaries, i.e., capillary side.

Notwithstanding the particular attractiveness and desirability of using the Hoehn et al. membranes in reverse osmosis processes, there has arisen with respect thereto a significant problem which severely affects the practical assembly and operation of permeation separation apparatus wherein such membranes are incorporated. This problem concerns the tendency of such membranes to swell or experience dimensional change in water. The water swelling potential or extent to which dimensional change occurs in water is such that the hollow interiors of encapsulated or potted portions of the capillary length become constricted. In such case, the flow of water permeate is restricted or halted completely.

While the problem of swelling may be resolved by avoiding acid grafting of the polymer hollow filaments in the potting or encapsulating areas by techniques described by Hoehn et al., infra, such techniques are relatively complicated in mechanical execution and relatively expensive to carry out. These techniques necessarily require assembling the hollow filaments into bundles prior to inducing the acid grafting reaction, thereby ruling out the economical use of hollow filaments acid grafted over their entire lengths in continuous filament form. Further, as induction of the acid grafting reaction must necessarily be limited to the active lengths of the hollow filaments, expensive and complex measures must be taken to protect the potting areas.

SUMMARY OF THE INVENTION

The invention is directed to a process for treating reverse osmosis membranes of acid grafted, substantially linear nitrogenous polymers to reduce the tendency of such membranes for dimensional change in water by converting the free acid groups of the polymers to less hydrophilic groups.

The invention is also directed to a reverse osmosis membrane of an acid grafted, substantially linear nitrogenous polymer wherein at least a portion of the polymer is characterized by a reduced tendency for dimensional change in water and comprises less hydrophilic groups in substitution of its free acid groups.

The invention is further directed to an improvement in a permeation separation apparatus adapted for the reverse osmosis separation of components of aqueous solutions and mixtures and comprising at least one cast wall member in sealing relationship with a plurality of selectively permeable, capillary membranes of an acid grafted, substantially linear nitrogenous polymer wherein the polymer in the sealing areas of the membranes is characterized by a reduced tendency for dimensional change in water and comprises less hydrophilic groups in substitution of its free acid group.

The invention also contemplates an improvement in a process for assembling permeation separation apparatus comprising assembling into a bundle a plurality of reverse osmosis membranes comprising hollow filaments of a substantially linear nitrogenous polymer and having grafted acid groups over their entire lengths, treating a portion of the bundle to convert the free acid groups of such portion to less hydrophilic groups, and encapsulating the treated portion with a potting compound.

The invention is based in part on the concept that the water swelling tendency of reverse osmosis membranes of acid grafted, nitrogenous polymeric material may be effectively reduced by treatment with chemical reactants to convert the free acid groups present to less hydrophilic groups and stems in part from the discovery that polyvalent metal salts, organic isocyanates, diazomethane and hydrazoic acid are effective agents for such purpose.

The inventive concept extends to the improvement of permeation separation apparatus employing hollow filament, reverse osmosis membranes and is based in part on the utilization of nylon hollow filaments acid grafted over their entire lengths in continuous filament form. The practical and economic advantages attendant such utilization are based conceptually on the feasibility of converting acid groups to a more desirable form after grafting in contrast to avoiding the formation of acid grafts in given areas during the grafting process.

DESCRIPTION OF THE INVENTION

Graft Copolymers

Figure 1:
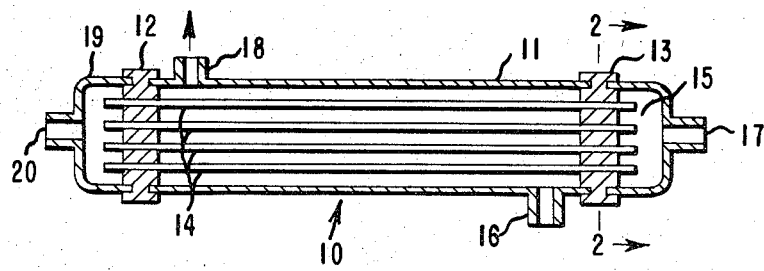
FIG. 1 is a cross-sectional view in elevation of a specific embodiment of a hollow filament reverse osmosis permeation separation apparatus assembled in accordance with the invention.

The graft copolymers which are modified to provide the selectively permeable membranes used in practicing the present invention are described in detail by Tanner, infra. These copolymers, in turn, are prepared from substantially linear nitrogenous condensation polymers. Such polymers are characterized by recurring  atoms as an integral part of the polymer chain and preferably bear at least about 300 titratable acid groups per $10^6$ grams of polymer, at least about 200 of said acid groups being chemically bonded by a carbon-to-carbon linkage to a catenarian carbon atom of said polymer and removed by at least one carbon atom from said catenarian carbon atom.

The nitrogenous polymers from which the graft copolymers are made include the polyamides, which are characterized by recurring

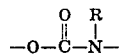

links in the polymer chain, where R may be hydrogen or an organic radical. High molecular weight fiber-forming polyamides, now well known as "nylons", are preferred in forming these products.

Other well known polymers comprehended in the defined class are the polyurethanes characterized by recurring

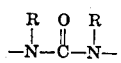

groups and polyureas characterized by

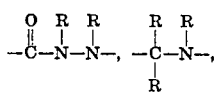

groups. Also included are those polymers with recurring main chain links such as $$-\overset{O}{\underset{\|}{C}}-\overset{R}{\underset{|}{N}}-\overset{R}{\underset{|}{N}}-,\ -\overset{R}{\underset{|}{C}}-\overset{R}{\underset{|}{N}}-,$$
$$\phantom{xxxxxxxxxxxxxxxxxxx}\underset{R}{|}$$

and the like. The R substituents on the nitrogen atom may be alike or different and are preferably hydrogen or a monovalent hydrocarbon radical. Preferably, such hydrocarbon radical is free of aliphatic carbon-to-carbon unsaturation and contains no more than 18 carbon atoms.

In making the starting polymers for the practice of the invention, hydrophilic side chains are grafted onto such a nitrogenous polymer by known means, such as high energy ionizing radiation or the action of free radical generating catalysts. The material grafted is desirably a polymerizable unsaturated organic acid or a univalent metal salt of such acid which may be applied to the nitrogenous polymer either before, during, or after application of the grafting means. The preferred material grafted is acrylic acid, although numerous other materials are suitable for grafting including methacrylic, ethylacrylic, crotonic, propiolic, styrenecarboxylic, maleic, dichloromaleic, fumaric, butadienecarboxylic, itaconic, styrenesulfonic, ethylenesulfonic acids and the like, and the sodium salts thereof. Where the material grafted is an acid, it may be converted to univalent metal salt from after grafting.

By the expression "300 titratable acid groups per $10^6$ grams of polymer" is meant the number of equivalents of —COOH ends per $10^6$ grams of polymer, for example as determined by the method of Taylor and Waltz Analytical Chemistry 19, 448 (1947). If the graft copolymer is insufficiently soluble in hot benzyl alcohol, a satisfactory determination of acid groups may be made by boiling the finely divided copolymer sample gently in 0.1 N NaOH followed by back titrating excess base with 0.1 N HCl using bromo-cresol green indicator. When the graft copolymer has its acid groups in the form of univalent metal salts, these groups are first converted to acid form by hydrolysis of the salt with strong acid prior to the determination noted above.

When the grafted moiety of the graft copolymer is acrylic acid, a concentration of 300 titratable acid groups per $10^6$ grams of polymer is obtained when the graft copolymer shows a grafted weight gain of acrylic acid of about 3 percent. Thus, the nitrogenous polymers as defined above having at least about 3 percent by weight of grafted acrylic acid are regarded as containing at least about 300 titratable acid groups per $10^6$ grams of polymer.

SELECTIVELY PERMEABLE MEMBRANES

Selectively permeable membranes for use in the present invention are prepared by preforming membranes of the starting nitrogenous polymers from which the graft copolymers are made or by forming into membranes the copolymers resulting from the grafting process. The inventive membranes, whether preformed or postformed, may take any known physical configuration employed in permeation separation processes, such as uniplanar film or a hollow filament, and methods well known in the art, such as extrusion and melt or solution spinning, may be employed in their formation.

TREATMENT TECHNIQUE

The inventive technique for reducing the water swelling tendency of selectively permeable membranes of the aforementioned graft copolymers involves treatment thereof with a chemical reactant which is effective to reduce the hydrophilic nature of the free acid groups present in such graft copolymers. A practical choice, of course, dictates a selection based not only on efficacy for the stated purpose but also on the nonreactivity with water of the chemical modification produced by treatment therewith. Accordingly, a chemical reactant which is capable of converting carboxyl groups into acyl chloride groups is unattractive even though the hydrophilic nature of the free acid groups is reduced, since acyl chlorides react with water.

A simple chemical modification contemplated by the present invention involves treatment of acid grafted substantially linear nitrogenous polymers to effect conversion of free acid groups into their polyvalent metal salts. This modification is easily obtained by soaking the graft copolymer in membrane form in a water solution of a polyvalent metal salt. The preferred polyvalent metal salts are salts of the divalent alkaline earth metals magnesium, calcium, and barium and the trivalent metals iron and aluminum, but salts of other polyvalent metals may also be used, including water soluble salts of strontium, manganese, nickel, copper, zinc, mercury, and lead. These metals may be used in the acetate, chloride, nitrate or sulfate form.

Another chemical modification within the purview of the invention and which converts the carboxylic acid groups of acid grafted linear nitrogenous polymers into less hydrophilic groups is esterification. A particularly useful reactant for esterifying carboxylic acid groups is diazomethane. The reaction is usually carried out in an ethereal or hydrocarbon solution and converts the acid groups into the methyl ester with evolution of nitrogen.

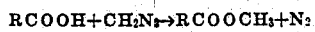

$$RCOOH + CH_2N_2 \rightarrow RCOOCH_3 + N_2$$

In carrying out this modification with membranes of acid grafted linear nitrogenous polymers, it is convenient to soak the polymer membrane in a solution of diazomethane at 25° to 50° C. for a few hours or until the characteristic color of diazomethane is dissipated. The membrane is then drained and rinsed with a series of solvents ending with a water soluble or easily evaporated solvent. The chemical reactions involved are known to the art and details thereof are discussed by Eistert, B. in Newer Methods of Preparative Organic Chemistry, (Edited by Foerest, W.) N.Y., Academic Press, Vol. 1, 1948, pp. 513 ff.

A further chemical modification which converts the carboxylic acid groups of linear nitrogenous polymers into less hydrophilic groups is reaction with hydrazoic acid or one of its precursors in the presence of sulfuric acid followed by treatment with water. This modification converts the carboxylic acid groups to amine groups.

$$RCOOH + HN_3 \rightarrow RNH_2 + CO_2 + N_2$$

In carrying out this modification with membranes of acid grafted linear nitrogenous polymers, it is convenient to soak the dry polymer in a mixture of concentrated sulfuric acid, sodium azide and a solvent such as benzene or chloroform. The polymer membrane is then drained and rinsed with a series of solvents ending with a water soluble or easily evaporated solvent. Various aspects of the reactions involved, known to the art, are discussed by Wolff, H. in Organic Reactions, (Edited by Cope, A. C. ) N.Y., Wiley, Vol. 3, 1946, pp. 307 ff.

The preferred chemical modification of carboxylic acid grafted linear nitrogenous polymers to reduce their tendency to swell with water involves conversion of the carboxylic acid groups to amide groups by reaction with an isocyanate.

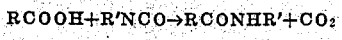

$$RCOOH + R'NCO \rightarrow RCONHR' + CO_2$$

In this equation —COOH represents any acid group in the graft copolymer and —CONHR' represents the resulting amide group. R' in the isocyanate (and the amide) may be a hydrocarbon group of 18 carbon atoms or less and free of aliphatic carbon-to-carbon unsaturation, or such a hydrocarbon group carrying another isocyanate (—NCO) substituent. The hydrocarbon group may be aliphatic, cycloaliphatic, aromatic, aralkyl, alkaryl, and the like. When RNCO is a diisocyanate, any isocyanate groups remaining in R after the above reaction are converted to amine groups when the treated portion of the graft copolymer comes in contact with an aqueous medium. Preferred isocyanates for effecting this modification comprise phenylisocyanate, 1-naphthylisocyanate, and toluene diisocyanate. However, suitable isocyanates for such modification may be selected from the following:

methyl isocyanate;
n-butyl isocyanate;
ethyl isocyanate;
isopropyl isocyanate;
dodecyl isocyanate;
octadecyl isocyanate;
hexamethylene diisocyante;
$\alpha, \alpha, \alpha', \alpha'$-tetramethylxylylene diisocyanate;
4, 4'-diisocyanatodicyclohexylmethane;
o-tolyl isocyanate;
p-tolyl isocyanate;
methylene-di-p-phenyl diisocyanate;
dodecylbenzene diisocyanate;
4-ethylenephenyl (1,1-dimethylethyl) isocyanate;
1.5-napthylene diisocyanate;
$\alpha,\alpha$-dimethylphenethyl isocyanate;
4-phenanthrayl isocyanate;
1-adamantyl isocyanate;
2,4-diisocyanatotoluene;
2,7-diisocyanatotoluene;
cyclohexyl isocyanate;
benzyl isocyanate.

Amide modification is conveniently carried out by soaking a polymer membrane in the technically pure isocyanate or a solution of the isocyanate in a solvent such as xylene or orthodichlorobenzene or a mixture of solvents such as xylene and dimethylacetamide. A suitable rate of reaction is obtained with thin membranes within about 1 to 6 hours at temperatures in the range of about 100° to about 150° C. Treatments for about 4 hours at about 125° C. are preferred for membranes between 10 and 50 microns in thickness, using solutions containing about 25 parts of phenyl isocyanate in a mixture of 5 to 20 parts of dimethylacetamide and 70 to 55 parts of xylene. Such conditions result in an increase in weight of the treated polymer, in essentially complete disappearance of an infrared absorption peak at 5.8 microns characteristic of carboxyl carbonyl compounds, and in destruction of the ability of the treated polymer to form metallic salts. The products of such treatments exhibit reduced swelling upon soaking in water.

ASSEMBLY TECHNIQUE

In a preferred embodiment of the present invention, there is provided an improved procedure for assembling permeation separation apparatus adapted for the reverse osmosis separation of components of aqueous solutions and mixtures and comprising at least one cast wall member in sealing relationship with a plurality of selectively permeable, capillary membranes of an acid grafted, substantially linear nitrogenous polymer.

Figure 2:
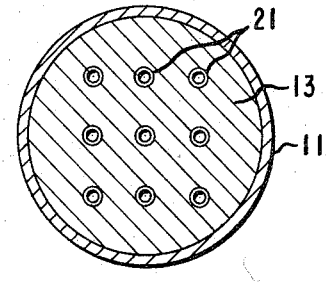
FIG. 2 is a sectional view through 2-2 of FIG. 1.

A typical apparatus suitable for assembly in accordance with the inventive technique comprises a "double-ender" type of permeation separation apparatus as depicted in the drawings. The inventive technique, of course, is not limited to this particular type of apparatus and the latter is merely offered by way of illustration and for the purpose of providing a better understanding of the practice of the invention. Upon recourse thereto, it is observed that FIG. 1 depicts a permeation separation apparatus, indicated generally as 10, and that FIG. 2 depicts a cross section of such apparatus through 2–2 of FIG. 1. The drawings show shell 11 containing hollow filament or capillary bundle 14 which is potted in capillary sheets or wall members 12 and 13. One end of bundle 14 extends through wall member 12 into capillary-side chamber 15 and the other end extends through wall member 13 into capillary-side chamber 19. In operation, fluid is fed into apparatus 10 through feed inlet 16, permeates through the walls of the filaments or capillaries of bundle 14, passes through the hollow interiors thereof into capillary-side chambers 15 and 19 and is withdrawn through exits 17 and 20, respectively. Excess fluid not permeated is withdrawn through exit 18 of shell 11. The hollow ends or openings 21 of the capillaries comprising bundle 14 (not to scale) are shown in FIG. 2 extending through wall member 13 mounted in shell 11. It is understood that bundle 14 may actually contain millions of hollow filaments or capillaries.

The inventive assembling technique generally comprises assembling into a bundle a plurality of reverse osmosis membranes comprising hollow filaments of a substantially linear nitrogenous polymer and having grafted acid groups over their entire lengths, treating a portion of the bundle to convert the free acid groups present in said portion to less hydrophilic groups, and encapsulating the treated portion of said bundle with a potting compound.

A more complete explanation and understanding of the inventive assembling technique may be had by recourse to the following detailed description of the assembling steps:

1. Spinning of hollow fibers of a nylon polyamide by processes similar to those described by Breen et al., infra.
2. Grafting these hollow filaments with acrylic acid either batchwise or continuously by the processes of Tanner, infra.
3. Assembling one or more bundles of these acid grafted hollow filaments suitable for installation into water desalination apparatus. These bundles may be made of hollow filaments cut to length as described by Mahon, Infra, or preferably of continuous filaments wound into a hank and stretched to form bundles as described by Maxwell et al., infra. If the hollow filaments are of cut lengths as described by Mahon, infra, provisions like those described in this patent must be made to prevent penetration into and plugging of the capillaries of the hollow filaments by treating materials and sealing materials in later steps of the process.
4. Treating of the ends of the bundles by any of the processes of this invention to reduce the tendency of the acid grafted nylon to swell upon immersion in water.
5. Completing assembly of water desalting apparatus as described by Mahon, infra, or Maxwell et al., infra, including the step of sealing together the end of the hollow filaments into an epoxy resin cement plug and the other steps described for installing one or more bundles of hollow filaments inside a suitable shell, sealing the epoxy resin plug to this shell, and completing the assembly of the apparatus.

EXAMPLES

The various features of this invention are illustrated by the following examples. Parts are by weight unless otherwise indicated.

EXAMPLE 1

A sheet of 1-mil nylon 66 film was placed in an unsealed polyethylene bag. The bag was placed on a tray of crushed solid carbon dioxide and passed five times through the beam of a Van de Graaf apparatus operated at 2 m.e.v. and 250 microamperes. The bag was then covered with crushed solid carbon dioxide and taken to a laboratory for treatment with acrylic acid. The cold irradiated film was transferred from the bag to a tray containing 25 parts by volume acrylic acid and 75 parts by volume water and allowed to soak at room temperature for 15 minutes. It was then subjected to a series of 5-minute washings, initially in a first tray with distilled water and serially thereafter in five separate trays with fresh distilled water. After hanging in air to dry, the film showed a weight gain of about 15 percent of acrylic acid. The above procedure was repeated and the additional weight gain was 10.8 percent.

A sample of this film was immersed in phenyl isocyanate in a vessel blanketed with nitrogen and heated at 125°C. After 1 hour the film was removed and washed once with dimethylformamide and three times with pentane, and dried at room temperature under reduced pressure.

In infrared measurements, the absorption peak at 5.8 microns typical of carboxyl carbonyl compound was substantially reduced in the isocyanate treated film in comparison with the untreated acid grafted film.

Samples of the isocyanate treated and untreated acid grafted film were immersed in aqueous 5 percent sodium carbonate solution and visually observed. The untreated film became swollen, limp, and soft, but the treated film showed no apparent change in size or texture.

Similar reductions in swelling upon immersion in water were obtained when acrylic acid grafted nylon films were treated in similar manner with 1-naphthyl isocyanate and with toluene diisocyanate.

This example shows that treatment of acrylic acid grafted nylon films with an isocyanate reduces the carboxyl carbonyl activity introduced by the grafting reaction and greatly reduces the tendency of the grafted film to change in size and texture upon exposure to water.

EXAMPLE 2

A piece of 66 nylon film 1 mil thick was sealed in a polyethylene bag fitted with inlet and outlet hose connections. The bag was evacuated and flushed with nitrogen several times to remove air, the inlet and outlet were capped with eyedropper bulbs, and the bag containing film placed on a bed of crushed solid carbon dioxide. The film was passed under an electron beam operated at 2 m.e.v. and 250 microamperes for a total of 10 passes. The film was then covered with crushed solid carbon dioxide and taken to a laboratory for treatment with acrylic acid. The film and bag were placed in a tray and an aqueous solution of 25 percent acrylic acid by volume was introduced into the bag. The film was allowed to soak in the acrylic acid solution for 15 minutes whereupon it was removed, placed in a tray of distilled water for 5 minutes, and then further rinsed with water and dried. The weight gain was 33 percent.

Samples of this film were immersed in phenyl isocyanate solutions for 1 hour at 125° C. and were then washed in pentane and dried. Sample A was immersed in 100 percent phenyl isocyanate. Sample B was immersed in a 25 percent solution of phenyl isocyanate in xylene. Sample C was immersed in a 25/5/70 (by volume) phenyl isocyanate/dimethylacetamide/xylene solution. Sample D was an untreated control sample. The film samples were each washed in 5 percent aqueous sodium carbonate for 15 minutes and then soaked in water for 24 hours. The following measurements indicate the extent of reaction with phenyl isocyanate and the swelling resistance obtained.

| Film sample | Percent | | | |
| --- | --- | --- | --- | --- |
|  | A | B | C | D |
| Wt. gain, after—NCO treatment | 12.7 | 8.8 | 14.9 | ----- |
| Wt. gain, after Na$_2$CO$_3$/H$_2$O treatment, 24 hours | 6.8 | 11 | 1 | 80 |
| Film elongation, after Na$_2$CO$_3$/H$_2$O treatment, 24 hours | 3.5 | 2.9 | 1.3 | 24 |

This example shows quantitatively the weight gain from treating acrylic acid grafted nylon films with an isocyanate under various conditions and the corresponding reductions in water absorption and elongation upon subsequent treatment with sodium carbonate and water.

EXAMPLE 3

A bundle was prepared from 366 yarns, each containing 17 filaments of hollow nylon 66 fiber with an average inside diameter of about 20 microns and outside diameter of about 50 microns for a void content of 16 percent.

The fiber bundle was protected by a cover of woven nylon mesh and placed in a polyethylene bag. The bag was laid on a bed of crushed solid carbon dioxide and irradiated by passing it through the beam of a Van de Graaf apparatus six times while operating the Van de Graaf apparatus at 2 m.e.v. and 250 microamperes. The fiber bundle was then removed from the bag, immersed for 15 minutes in a 25 percent by volume aqueous solution of acrylic acid, washed five times for 5 minutes each with distilled water, and dried. The weight gain was about 44 percent.

The ends of the bundle were immersed (under nitrogen) in a mixture of 25 volumes of phenyl isocyanate, 10 volumes of dimethylacetamide, and 65 volumes of xylene for 1 hour at 125° C. The whole bundle was then washed with pentane and dried.

The above bundle was immersed in 5 percent aqueous sodium carbonate solution. The isocyanate treated portion remained essentially unaffected while the untreated portion swelled extensively. The bundle was then immersed in a dilute aqueous copper sulfate solution. The treated portions remained colorless but the untreated portions turned blue indicating that the carboxyl reactivity of the treated portion had been destroyed by the isocyanate treatment.

This example shows the treatment of acrylic acid grafted nylon in hollow filament form with an isocyanate to reduce swelling in water and demonstrates the reduction in carboxylic acid activity obtained.

EXAMPLE 4

Three hollow nylon fiber bundles containing about 84 yarns each containing 17 filaments of nylon 66 hollow fiber were grafted with acrylic acid by the general procedure of Example 3. An irradiation dosage level of six passes through the Van de Graaf beam was used, the bundles were treated with 25 percent aqueous acrylic acid, and the weight gains were about 23 percent. The bundles were dried overnight at 90° C. in a vacuum oven and a 10-inch length of one end of each bundle was immersed under nitrogen in a 10 percent by volume solution of phenyl isocyanate in dimethylacetamide for 15 minutes at room temperature. The temperature was then raised to 125° C. for 4 hours, after which the bundles were rinsed with dimethylacetamide and dried. The isocyanate treatment was repeated with the other bundle ends, after which the entire bundles were immersed in 5 percent aqueous sodium carbonate at 50° C. for 2 hours, rinsed with distilled water, and dried.

The three acrylic acid grafted hollow nylon fiber bundles with isocyanate treated ends were assembled into desalination apparatus of the type shown in FIG. 1. The openness of the hollow fibers for flow of water through their capillary openings was demonstrated by applying water at a pressure of 200 p.s.i.g. to one end of each permeator and measuring the rate of water flow through the fibers. The flow rates were in essential agreement with calculated flow rates assuming an effective internal diameter of 21 to 24 microns.

The water desalination properties of the three treated hollow fiber bundles were determined by applying to their outer surfaces at a pressure of 210 p.s.i.g. an aqueous solution containing 700 parts per million calcium sulfate, 400 parts per million magnesium sulfate, and 400 parts per million sodium sulfate formulated to simulate many midcontinent ground waters. The rate of water passage through the walls of the hollow fibers was measured and the sulfate content of the permeated water was determined. The following data were obtained for a considerable time after equilibrium had been established.

| | Permeation rate, gal./ ft.²/day | Salt passage, percent |
| --- | --- | --- |
| Bundle: | | |
| A | 0.025 | 6 |
| B | 0.025 | 5 |
| C | 0.027 | 5 |

In contrast, an acrylic acid grafted nylon hollow fiber bundle the ends of which were not treated in accordance with the invention exhibited no through-flow when assembled into a permeator of the type aforedescribed and subjected to the same testing conditions, as the hollow interiors of the epoxy resin encapsulated fiber ends had become constricted as a result of excessive swelling in water.

This example illustrates an improved process for assembling a hollow filament reverse osmosis water desalination apparatus which includes treating a portion of a bundle of hollow fibers with a reactant which converts free carboxylic acid groups into less hydrophilic groups and encapsulating the treated portion of the bundle in a setting resin.

EXAMPLE 5

A piece of 66 nylon film 1 mil thick was treated with acrylic acid as described in Example 2 with the following changes. The total number of passes under the electron beam was five instead of 10 and the concentration of the acrylic acid solution was 15 percent instead of 25 percent. After the treated films had been washed once in distilled water, it was placed in a 5 percent aqueous $Na_2CO_3$ solution for 15 minutes.

It was then washed four times for 5 minutes each in distilled water and hung up to dry in a hood. The total weight gain of the film was 33 percent.

A piece of this sodium acrylate-modified film measuring 76.5 mm. in length was immersed in distilled $H_2O$. After 1 hour the length was again measured and found to be 87 mm. representing a swelling of nearly 15 percent. The film remained essentially unchanged during the next 72 hours, indicating that equilibrium had been achieved. This example of the water swelling tendency of an unmodified grafted film is shown for comparison with the polyvalent metal ion-modified films of Examples 6—15 and the ungrafted film of Example 16.

EXAMPLES 6 — 10

In Examples 7—10 the same procedure as that of Example 5 was used except that the soaking period in 5 percent aqueous $Na_2CO_3$ was 30 minutes instead of 15 minutes. After the films had been washed, they were immersed for 24 hours in 5 percent aqueous solutions of a polyvalent metal salt to form the corresponding polyvalent metal acrylate salt. The films were then washed four times in distilled water for 5 minutes each and hung up to dry. In Example 6 a portion of the film of Example 5 was reswelled in water for 0.5 hour. It was then immersed in the treating solution for 0.5 hour instead of 24 hours. As in Example 5, strips of film about 76.5 mm. long were cut from each film and immersed in distilled water for 72 hours. The increase in length was then measured and the percent elongation calculated therefrom. The analytical data characterizing the combined acrylic acid grafting and metal treatment are shown in the table below.

| | Polyvalent metal salt | Percent metal | Total film, wt. gain | Elongation,[1] percent |
| --- | --- | --- | --- | --- |
| Example: | | | | |
| 6 | $CuSO_4$ | 4.95 | | 3.1 |
| 7 | $CaSO_4$ | 3.2 | 40.9 | 6.9 |
| 8 | $ZnCl_2$ | 9.3 | 64.6 | 5.4 |
| 9 | $AlCl_3$ | 0.1 | 38.7 | 4.1 |
| 10 | $FeCl_3$ | 0.6 | 23.7 | 3.9 |

[1] After 72 hours exposure in distilled water.

EXAMPLES 11 — 15

In these examples the same procedure as that in Example 5 was used except that the $Na_2CO_3$ treatment was omitted. After the acrylic acid treatment the films were washed six times for 5 minutes each in distilled water. The wet films were then immersed for 24 hours in 5 percent aqueous polyvalent metal salt solutions as in Examples 6—10. The films were washed and hung up to dry. To obtain the film treated with copper sulfate, a portion of an acrylic acid grafted film, prepared as described above and dried, was reswelled in water for 0.5 hour. It was then immersed in the copper sulfate solution for 0.5 hour, washed and dried. Strips of film about 76.5 mm. long were cut and immersed in distilled water and the percent elongation after 72 hours was determined as described in the preceding examples. These data together with the analytical data characterizing the films are shown in the following table.

| | Polyvalent metal salt | Percent metal | Total film, wt. gain | Elongation,[1] percent |
|---|---|---|---|---|
| Example: | | | | |
| 11 | CuSO₄ | 0.14 | | 2.0 |
| 12 | CaCl₂ | 2.2 | 42.6 | 3.7 |
| 13 | ZnCl₂ | 1.5 | 28.8 | 4.2 |
| 14 | FeCl₃ | 0.3 | 22.1 | 2.6 |
| 15 | AlCl₃ | 0.1 | 21.7 | 2.1 |

[1] After 72 hours exposure in distilled water.

EXAMPLE 16

For comparison purposes a piece of 66 nylon film 1 mil thick that had not been modified by acrylic acid grafting was cut to a known length and immersed in distilled water for 24 hours. Its length was remeasured and the elongation was found to be 2.8 percent. This result shows the small, natural water swelling tendency of 66 nylon.

The data of Examples 6—15 in comparison with those of Examples 5 and 16, the control samples, illustrate the strong desensitizing effect obtained by treating acrylic acid grafting nylon with metal ions that form insoluble salts. The water swelling tendency of the films containing the most useful metals was the same as, or slightly less than, that of unmodified nylon itself.

Having thus described the invention so that others skilled in the art may be able to understand and practice the same, it is expressly understood that various changes may be made in the methods, apparatus and membranes of this invention and that polymeric membrane materials and treating agents other than those specifically described herein may be employed without departing from the spirit and scope of the invention.

I claim:

1. A process for treating reverse osmosis membranes of acid grafted, substantially linear nitrogenous polymers to reduce the tendency of said membranes for dimensional change in water, said process comprising converting the free acid groups of said polymers to less hydrophilic groups.

2. A process according to claim 1 wherein said polymers are characterized by recurring —N— atoms as an integral part of the polymer chain and bearing at least about 300 titratable acid groups per million grams of polymer, at least about 200 of said acid groups being chemically bonded by a carbon-to-carbon linkage to a catenarian carbon atom of said polymer and removed by at least one carbon atom from said catenarian carbon atom.

3. A process according to claim 2 wherein conversion is effected with a treating agent selected from the group consisting of salts of polyvalent metals, organic isocyanates, diazomethane, and hydrazoic acid.

4. A process according to claim 2 wherein conversion is effected by exposing said membranes to a treating agent comprising an organic isocyanate at a temperature between about 100° C. and about 150° C. for a period of time between 1 and 6 hours and subsequently exposing the membranes to water.

5. A process according to claim 4 wherein said treating agent is in solution.

6. A reverse osmosis membrane of an acid grafted, substantially linear nitrogenous polymer, at least a portion of said polymer comprising less hydrophilic groups in substitution of its free acid groups and being characterized by a reduced tendency for dimensional change in water.

7. A membrane according to claim 6 wherein said polymer is characterized by recurring —N— atoms as an integral part of the polymer chain and bearing at least about 300 titratable acid groups per million grams of polymer, at least about 200 of said acid groups being chemically bonded by a carbon-to-carbon linkage to a catenarian carbon atom of said polymer and removed by at least one carbon atom from said catenarian carbon atom.

8. A membrane according to claim 6 wherein said less hydrophilic groups comprise a polyvalent metal salt form.

9. A membrane according to claim 6 wherein said less hydrophilic groups comprise a derivative ester form.

10. A membrane according to claim 6 wherein said less hydrophilic groups comprise a derivative amine form.

11. A membrane according to claim 6 wherein said less hydrophilic groups comprise a derivative amide form.

12. In a permeation separation apparatus adapted for the reverse osmosis separation of components of aqueous solutions and mixtures and comprising at least one cast wall member in sealing relationship with a plurality of selectively permeable, capillary membranes of an acid grafted, substantially linear nitrogenous polymer, the improvement wherein the polymer in the sealing areas of said membranes is characterized by a reduced tendency for dimensional change in water and comprises less hydrophilic groups in substitution of its free acid groups.

13. An apparatus according to claim 12 wherein said polymer is characterized by recurring —N— atoms as an integral part of the polymer chain and bearing at least about 300 titratable acid groups per million grams of polymer, at least about 200 of said acid groups being chemically bonded by a carbon-to-carbon linkage to a catenarian carbon atom of said polymer and removed by at least one carbon atom from said catenarian carbon atom.

14. An apparatus according to claim 13 wherein said less hydrophilic groups comprise a polyvalent metal salt form.

15. An apparatus according to claim 13 wherein said less hydrophilic groups comprise a derivative ester form.

16. An apparatus according to claim 13 wherein said less hydrophilic groups comprise a derivative amine form.

17. An apparatus according to claim 13 wherein said less hydrophilic groups comprise a derivative amide form.

18. In a process for assembling a permeation separation apparatus, the steps comprising assembling into a bundle a plurality of reverse osmosis membranes comprising hollow filaments of a substantially linear nitrogenous polymer and having grafted acid groups over their entire lengths, treating a portion of said bundle to convert the free acid groups present in said portion to less hydrophilic groups, and encapsulating the treated portion of said bundle with a potting compound.

19. A process according to claim 18 wherein said polymer is characterized by recurring —N— atoms as an integral part of the polymer chain and bearing at least about 300 titratable acid groups per million grams of polymer, at least about 200 of said acid groups being chemically bonded by a carbon-to-carbon linkage to a catenarian carbon atom of said polymer and removed by at least one carbon atom from said catenarian carbon atom.

20. A process according to claim 19 wherein said less hydrophilic groups comprise a polyvalent metal salt form.

21. A process according to claim 19 wherein said less hydrophilic groups comprise a derivative ester form.

22. A process according to claim 19 wherein said less hydrophilic groups comprise a derivative amine form.

23. A process according to claim 19 wherein said less hydrophilic groups comprise a derivative amide form.